May 7, 1968     D. J. KONEVAL     3,381,851
COOKING UTENSIL

Filed Oct. 18, 1965     2 Sheets-Sheet 1

INVENTOR.
DONALD J. KONEVAL

BY

ATTORNEY

May 7, 1968     D. J. KONEVAL     3,381,851

COOKING UTENSIL

Filed Oct. 18, 1965     2 Sheets-Sheet 2

INVENTOR.
DONALD J. KONEVAL

BY

ATTORNEY

United States Patent Office

3,381,851
Patented May 7, 1968

3,381,851
COOKING UTENSIL
Donald J. Koneval, Warrensville Heights, Ohio
(1912 Bromton Drive, Lyndhurst, Ohio 44124)
Filed Oct. 18, 1965, Ser. No. 497,179
19 Claims. (Cl. 220—85)

ABSTRACT OF THE DISCLOSURE

A cooking utensil adapted to support a disposable pan insert includes a metal frame comprising a plate adapted to be engaged by the bottom surface of the insert and a plurality of insert retaining members extending upwardly from the plate to restrain the insert against both lateral and vertical displacement. The retaining members are arranged to permit insertion and removal of the insert by resilient bending of the insert. Reference is made to the claims for a legal definition of the invention.

---

This invention relates to cooking utensils and more particularly to a cooking utensil utilizing a disposable pan insert and the method of making the same.

The invention has particular utility as a cooking utensil for outdoor use where facilities for washing are not readily available or are inconvenient. For example in outdoor recreational camping cooking is usually done over an open fire or a portable gasoline or kerosene stove. After a meal it is necessary to carry water for the purpose of cleaning the utensils or carry the utensils to a source of water where they may be properly cleaned. The chore is time consuming especially if a number of camping groups must share a single washing facility and interferes with recreational activities such as boating, fishing, etc.

Perhaps the most objectionable and time consuming task following a meal at a campsite is the washing of a grease laden frying pan. The chore usually involves scouring and repeated rinsings and requires a generous amount of cleansing agents in a camper's supplies.

Disposable utensils such as paper plates, paper cups and plastic or wood eating utensils have partially eliminated the campers' clean up chores after a meal. Heretofore, however, practical disposable cooking utensils for outdoor use over open fires have not been available.

Disposable cooking utensils for use in the home kitchen are well known in the art. For example disposable aluminum baking pans are commercially available. In addition frames such as disclosed in U.S. Patent No. 3,194,429 have been designed for limited use with disposable pans. However, such prior art cooking devices are designed for specific cooking operations and are not practical for general use as a cooking utensil in which food or liquids can be selectively fried, boiled, baked, etc. over an open flame and which may be inverted to facilitate removal of the contents thereof.

It is accordingly, a principal object of my invention to provide a cooking utensil utilizing a disposable pan insert for general use as a frying or cooking pan.

Another object of the invention is to provide a cooking utensil for retaining or supporting a disposable pan insert with such rigidity that the cooking utensil is structurally equivalent to the customary metal cooking pan.

Another object of the invention is to provide a cooking utensil for rigidly supporting and distributing heat to a thin walled disposable pan insert whereby the utensil may be used as a conventional metal cooking utensil in direct contact with a flame.

Another object of the invention is to provide a low cost sheet metal frame for receiving a disposable pan insert to define a cooking utensil of general utility.

One preferred embodiment of the invention comprises a metal frame having a flat bottom plate of surface area generally complemental to the bottom surface area of a disposable cooking pan insert. The bottom plate is provided with a plurality of upstanding retaining members which engage the peripheral portion of the disposable pan insert to thereby securely retain the pan insert in heat conducting contact with the bottom plate. A handle is attached to the frame for holding the same during use.

Other objects and advantages will become apparent from the following description taken in connection with the accompanying drawings wherein.

Figure 1:
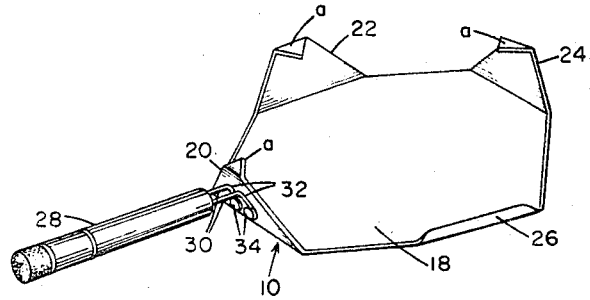
FIGURE 1 is a perspective view of a cooking utensil frame embodying the invention.

Referring now to FIGURES 1–4 of the drawings there is shown a cooking utensil frame identified generally by the reference numeral 10. The frame 10 is adapted to receive and rigidly support a thin walled semirigid disposable cooking pan insert 12 formed from aluminum or other suitable material. The pan insert 12 may comprise, for example, a commercially available thin walled (3 to 4 mils thickness) aluminum foil pan such as the type intended for use as disposable cake pans which may be purchased in quantity at a cost of a few cents per pan. The pan insert 12 depicted in FIGURE 2 comprises such a commercially available aluminum foil cake pan and is of circular configuration defining a slightly inclined sidewall 14 and an upper rim or flange 16. As will be apparent from the ensuing description, however, the invention can be readily utilized in connection with disposable pan inserts of different construction and noncircular configurations. A pan insert having an upper rim or flange is particularly suitable for some embodiments of the invention. Other forms, however, such as the type having an upper reinforcing bead are also suitable.

Referring specifically to FIGURE 1 the frame 10 comprises a flat bottom plate 18 which is adapted to be engaged by the bottom surface of the pan insert 12 in heat conducting relationship therewith. The plate 18 is preferably of configuration and area generally complemental to the bottom surface of pan insert 12 to provide for good heat conductivity and distribution. In the embodiments disclosed the bottom plate 18 is of octagonal configuration resulting from the particular fabrication technique utilized to define a generally circular area corresponding to the bottom surface area of pan insert 12. The frame 10 further includes a plurality (in this case four) of upstanding pan retaining members 20, 22, 24 and 26 of tapered width which may be formed integrally with the plate 18 as will later be described. Each of the retaining members 20, 22, 24 and 26 are equally spaced on a circle corresponding to the bottom diameter of the pan insert 12 whereby the bottom peripheral shoulder of the pan insert is engaged by the inner surface of the members 20, 22, 24 and 26 when positioned in the frame to thereby restrain the pan insert against lateral movement.

The three retaining members 20, 22 and 24 are of identical shape and configuration and have a height and inclination generally complemental to the side wall of the pan insert 12. The members 20, 22 and 24 are each provided at their upper extremity with an inwardly extending integral flange or retaining tab $a$. The dimensions are such that the tabs $a$ of retaining members 20, 22 and 24 engage the upper surface of the rim 16 when the pan insert 12 is placed within the frame to securely restrain the pan against vertical displacement and to thereby permit inverting of the utensil during removal of food, etc. The tabs $a$ and the inner surfaces of members 20, 22, 24 and 26 also effectively restrain the pan insert 12 against rotation relative to the frame 10.

Figure 4:
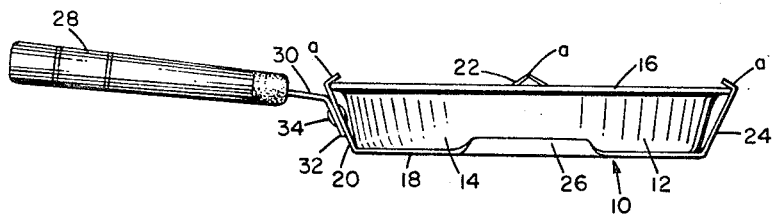
FIGURE 4 is a side view of the structure depicted in FIGURE 1.

To facilitate insertion of the pan 12 the retaining member 26 is preferably of smaller height as shown more clearly in FIGURE 4 and is not provided with a retaining tab. The height of member 26 is only sufficient to assist in restraining the pan insert 12 against lateral movement, the three tabs $a$ of the members 20, 22, 24 and 26 being sufficient to restrain the pan insert against vertical displacement and rotation.

To complete the cooking utensil frame 10 a handle 28 is fixed to the retaining member 20. As shown most clearly in FIGURE 1 the handle 28 may be supported by a pair of relatively stiff wire rods 30 bent as shown and provided at one end with suitable eyelets 32 for attachment to the member 20 such as by rivets 34. The other end of the rods may be force fitted within suitable axial bores of the handle 28.

Figure 2:
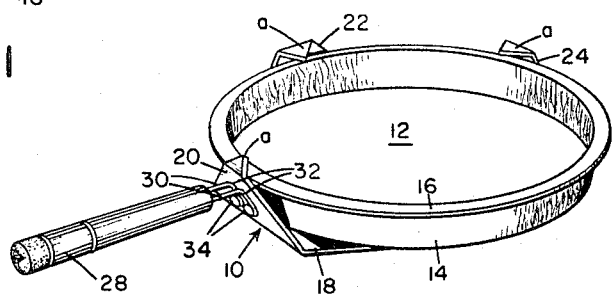
FIGURES 2 and 3 are perspective views of the cooking utensil frame depicted in FIGURE 1 showing a pan insert being inserted and fully inserted respectively.
Figure 3:
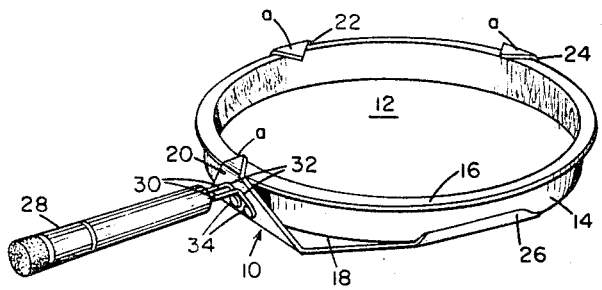

In use of the frame 10, the pan insert 12 is inserted from the side of the frame defined by retaining member 26 as shown in FIGURE 2. The pan insert 12 is inserted by sliding its bottom surface over the top of member 26 and simultaneously causing the rim 16 to engage the undersurface of tabs $a$ of members 20 and 24. By then exerting slight pressure to cause slight resilient deformation of the pan shape the pan can be pushed and snapped into its final position with the rim engaged by all three tabs. After a cooking operation the pan insert 12 is removed by grasping the side adjacent retaining member 26 and pulling the pan outward and upward to clear the top of member 26.

In use of the frame 10 and the pan insert 12 as a cooking utensil the bottom plate 18 may be placed in direct contact with the flames or hot coals of an open fire. The plate 18 effectively shields the relatively fragile pan insert 12 from the flames and uniformly distributes heat to the entire bottom surface of the pan insert 12. The retaining members 20, 22, 24 and 26 serve to maintain engagement of the pan insert with the bottom plate 18 to insure good thermal conductivity. The retaining members by means of tabs $a$ additionally support the disposable pan with sufficient rigidity that the utensil can be handled or inverted in the same manner as a conventional cooking utensil during use.

An important feature of the embodiment depicted in FIGURES 1-4 is the inherently low cost thereof resulting from the novel fabrication technique employed. More particularly the entire frame with the exception of the handle and attaching means therefor can be fabricated from a square piece of sheet metal with insignificant waste. In fabrication of the frame 10 a square piece of sheet metal such as 18 gauge aluminum is cut to the configuration shown in FIGURE 5. The retaining members 20, 22, 24, 26 and tabs $a$ are then formed simply by bending along the dashed lines in FIGURE 5. In the case of retaining member 26 the material indicated by the dotted lines is cut off prior to bending to achieve the preferred configuration of the part. After the bending operation the handle 28 may be attached to retaining member 20 to complete the assembly.

The embodiment of the invention shown in FIGURES 1-4 comprises a frying pan utensil. It will be apparent that by varying the planar dimensions of the plate 18 and the size of retaining members 20, 22, 24 and 26 the frame 10 can be fabricated to receive pan inserts of different diameters and depths to provide other specific types of cooking utensils. Because of the low cost of the frame 10 a camper can practically possess a number of frames for accepting various sizes of disposable inserts.

It will also be apparent that the frame 10 can readily be used with disposable inserts of a given square configuration and size simply by inserting the square pan insert with its corners positioned under tabs $a$ or retaining members 20, 22 and 24.

The frame structure shown in FIGURES 1-4 utilizes three retaining members 20, 22 and 24 each provided with a retaining tab $a$ and a single retaining member 26 of small height to facilitate insertion of the pan insert. As a practical matter only two of the retaining members need be provided with a retaining tab $a$ to adequately retain the pan insert particularly when the insert has an upper reinforcing flange or rim. For example the tab $a$ of retaining member 22 can be omitted or retaining member 22 could be made identical to member 26 with little loss of rigidity. However since the sheet metal which would be removed to accomplish such modifications would be waste it is preferred to use the three tab construction depicted in FIGURES 1-4.

Figure 5:
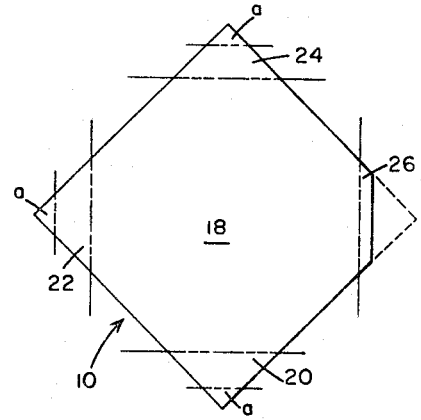
FIGURE 5 is a plan view of a sheet metal part illustrating the method of fabricating the structure shown in FIGURE 1.
Figure 6:
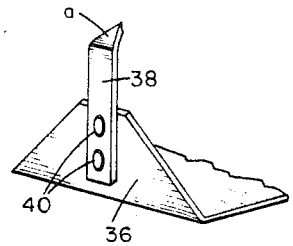
FIGURES 6, 7 and 8 are details illustrating modifications of parts shown in FIGURES 1–4.
Figure 7:
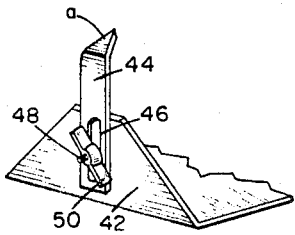
Figure 8:
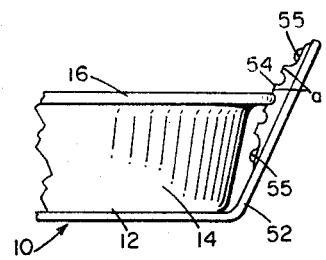
Figure 8A:
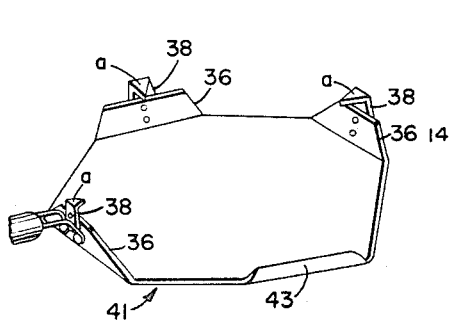
FIGURE 8a is a perspective view of a cooking utensil incorporating the modification illustrated in FIGURE 6.

Referring to FIGURES 6-8 of the drawings I have shown possible modifications of the retaining members 20, 22 and 24 to render the frame 10 more versatile or more suitable for specific types of pans. In FIGURE 6 of the drawings there is shown for example a modified version of the retaining members 20, 22 and 24 comprising an integral upstanding part 36 of the same general configuration as retaining members 20, 22 and 24. An extension member 38 formed from a strip of spring steel and defining a bent over retaining tab $a$ is fixed to part 36 such as by rivets 40. As shown in FIGURE 8a a frame 41 may comprise three retaining members 36 each having an extension member 38 fixed thereto by rivets 40 and a retaining member 43 similar to the retaining member 26 shown in FIGURE 1, a handle being suitably attached to one of the parts 36. The frame 41 will accordingly function in the same general manner as the frame 10 depicted in FIGURE 1. The member 38 serves to increase the effective height of retaining members 20, 22 and 24 above that which can be obtained when the frame is formed from a square piece of sheet metal as shown in FIGURE 5. Use of extensions such as spring strips 38 permit pans of greater depth to be accommodated without resorting to fabrication of larger sheet metal sheets and departure from the generally square pattern shown in FIGURE 5.

The embodiment of the retaining members depicted in FIGURE 7 achieves the same general result as that shown in FIGURE 6 and additionally renders the retaining members 20, 22 and 24 adjustable in height whereby the frame 10 can accept pan inserts of variable depth. More specifically there is shown an upstanding integral retaining member 42 similar to the member 36 of FIGURE 6. An adjustable extension member 44 defining a retaining tab $a$ and provided with an elongated slot 46 is adjustably attached to member 42 by means of a bolt 48 and wing nut 50, the bolt 48 extending through a suitable drilled hole in member 42 and slot 46 in extension member 44. By means of a bolt 48, wing nut 50 and slot 46 the extension member 44 may be selectively positioned in a range of positions to accommodate pan inserts of various sizes.

Referring to FIGURE 8 of the drawings I have shown still another modification of retaining members 20, 22 and 24 for achieving adjustability with respect to pan insert depths. In FIGURE 8 there is shown an upstanding retaining member 52 comprising an integral part similar to the members 20, 22 and 24 but with tab *a* omitted. A curved elongated sheet metal part 54 is indented as shown to define a plurality of spaced tabs *a* for engaging the rim of disposable pan inserts. The part 54 may be attached to the member 52 such as by rivets 55. The tabs *a* are preferably spaced on each part 54 to accommodate selected sizes of disposable pan inserts.

Figure 9:
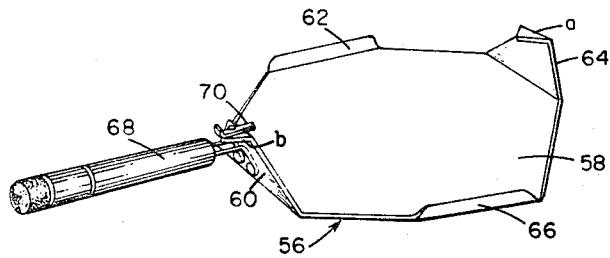
FIGURE 9 is a perspective view illustrating another embodiment of the invention.
Figure 10:
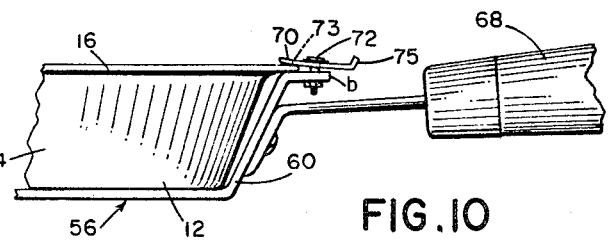
FIGURE 10 is a fragmentary side view of the structure depicted in FIGURE 9.

Referring to FIGURES 9 and 10 of the drawings I have shown an embodiment of the invention for achieving maximum ease of insertion and removal of the pan insert 12. Referring specifically to FIGURE 9 there is shown a frame 56 comprising a plate 58 defining a plurality of upstanding retaining members 60, 62, 64 and 66. The plate 58 is identical in configuration to plate 18 and retaining member 64 is identical in configuration to retaining member 24 of FIGURES 1–4. Retaining members 62 and 66 are identical in construction to retaining members 20, 22 and 24 but are not provided with retaining tabs *a* as shown in FIGURE 1. Retaining member 60 is similar to members 62 and 66 but provided with an outwardly extending tab *b* adapted to be engaged by the underside of the pan insert rim as shown in FIGURE 10. The tab *b* may be formed integrally with member 60 in the same manner as tab *a*. A handle 68 is attached to retaining member 60 in the same manner as handle 28 of FIGURES 1–4.

The embodiment of FIGURES 9 and 10 includes releasable clamping or detent means for clamping the rim of the insert 12 to the flange *b* of member 60. More specifically as shown in FIGURE 10 a sheet metal clamping member 70 is slidably mounted on flange *b* by means of a screw 72 cooperative with a slot 73 in member 70. The left end portion (as viewed in FIGURE 10) of member 70 is bent slightly upward whereby said portion engages the rim of insert 12 with a wedge-like clamping action in the position shown. Upon displacement of the member 70 to the right from the position shown it will move out of engagement with the insert rim 16. An abutment 75 is provided on the right end of member 70 to facilitate displacement thereof by the user of the utensil.

In use of the embodiment disclosed in FIGURES 9 and 10, with the member 70 retracted, the pan insert 12 is merely set into the frame 56 with one portion of the rim 16 under tab *a* of retaining member 64 and the opposite rim portion engaging flange *b* whereupon the member 70 is actuated by the user into clamping engagement with the portion of the pan insert rim engaging flange *b* of retaining member 60. The member 70 effectively provides a releasable retaining tab.

The embodiment disclosed in FIGURES 9 and 10 eliminates the need for resiliently deforming the disposable pan insert during insertion thereof through the provision of the releasable detent means defined by member 70 and permits the insert to be removed without handling by the user of the utensil. The retaining action of tab *a* of member 64 and the clamping action of member 70 imparts sufficient rigidity to the cooking utensil to enable it to be used in the same manner as the embodiment shown in FIGURES 1–4.

Figure 11:
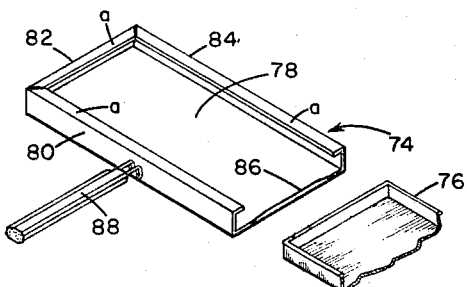
FIGURE 11 is a perspective illustrating another embodiment of the invention.

Referring to FIGURE 11 of the drawings there is shown an embodiment of the invention particularly adapted for use with disposable pan inserts of square configuration. More specifically there is shown a sheet metal frame 74 adapted to receive and retain a disposable rectangular insert 76. The frame 74 comprises a flat bottom plate 78 of planar dimensions complemental to the bottom dimensions of insert 76. The frame 74 further includes three sidewalls or retaining members 80, 82 and 84 formed integrally with plate 78 and extending upwardly therefrom. Each of the walls 80, 82 and 84 define an integral elongated flange or retaining tab *a* at the top thereof, the three walls jointly defining a substantially continuous retaining flange. At the open side of the frame a retaining member 86 of short height is formed integrally with the plate 78. To complete the assembly a handle 88 is attached to the wall 80 in the same manner as handle 28 of FIGURES 1–4.

In use of the frame 74 the insert 76 is inserted into the open side thereof with the upper edges thereof engaging the underside of the flanges *a* of walls 84 and 80. Sufficient insertion pressure is exerted on the insert to force the same inwardly over retaining member 86 and into engagement with wall 82. Retaining member 86 cooperates with walls 80, 82 and 84 in retaining the insert in its operative position. To remove the insert it is only necessary for the user to apply a pulling force sufficient to cause the bottom to slide up and over the member 86.

Figure 12:
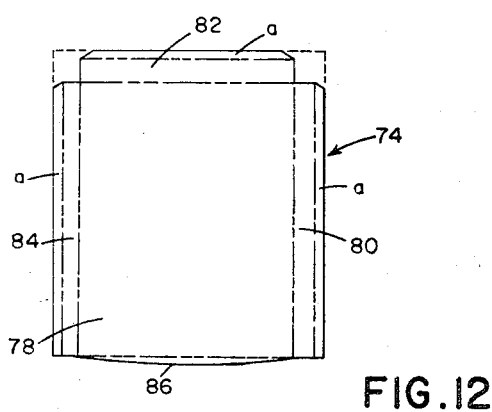
FIGURE 12 is a plan view of a sheet metal part illustrating the method of fabricating the structure depicted in FIGURE 11.

As will be apparent from FIGURE 12 the frame 78 may be readily formed from a substantially rectangular piece of sheet metal with little waste. Specifically a rectangular piece of sheet metal such as depicted in FIGURE 12 can be bent as indicated by the dashed lines to form the integral retaining members 80, 82, 84 and 86. The corner material indicated by the dotted lines is removed by cutting prior to bending.

It will be apparent that the wall 82 of frame 78 can be omitted and replaced by an integral member identical to retaining member 86. The two opposite walls remaining would be sufficient to support insert 76.

It will be apparent that the walls 80, 82 and 84 can be selectively cut and divided into a plurality of narrow retaining members of size and shape of members 20, 22 and 24 of FIGURES 1–4. Such an expedient would not, however, result in a saving of sheet metal and accordingly the three continuous walls as shown are preferred for the embodiment of FIGURES 11 and 12.

While several embodiments of the invention have been herein disclosed and described it will be apparent to those skilled in the art that many additional modifications are possible and that the scope of the invention is defined by the appended claims.

It is claimed and desired to secure by Letters Patent of the United States:

1. A cooking utensil for supporting a disposable pan insert comprising: an integral sheet metal frame comprising a flat plate having four upwardly bent corner portions defining four insert retaining members for engagement with the peripheral portions of the insert to restrain the insert against lateral displacement relative to said plate, at least two of said retaining members having a height complemental to the depth of the insert and having integral inwardly bent rigid retaining tabs at the upper end thereof adapted to extend over and frictionally engage the upper portions of the insert to restrain the insert against vertical displacement relative to said plate, said two retaining members being positioned on said plate relative to the peripheral dimensions of the insert to permit insertion and removal of the insert by resilient deformation of the insert.

2. A cooking utensil as claimed in claim 1 wherein one other of said retaining members is of said height and provided with an integral bent retaining tab and the fourth retaining member is of small height to facilitate insertion of the insert within said frame.

3. A cooking utensil utilizing a rectangular disposable pan insert comprising: a sheet metal frame comprising a flat plate having upwardly bent edge portions defining four insert retaining members for engagement with the peripheral portions of the insert, at least two of said members defining sidewalls having a height complemental to the depth of the insert and having upper retaining flanges engageable with the upper portions of the insert, at least one other member having a height less than the depth of the insert to facilitate insertion of the insert.

4. A cooking utensil utilizing a circular thin walled semirigid disposable pan insert comprising: a sheet metal bottom plate adapted to be engaged by the bottom surface of the insert defining a plurality of integral upstanding retaining members spaced in a circular pattern complemental to the diameter of the insert for engaging and retaining the insert in engagement with said bottom plate, said retaining members including at least two retaining members of height complemental to the depth of the insert positioned diametrically opposite to each other and defining surfaces adapted to engage the upper surfaces of the insert to restrain the insert against vertical displacement relative to said plate and at least one member of small height relative to the depth of the insert to facilitate insertion of the insert in the utensil.

5. A cooking utensil comprising: a disposable thin walled semirigid pan insert having a flat bottom wall; a metal frame defining a flat bottom plate having planar dimensions generally complemental to said bottom wall of said insert; insert retaining means defined by said frame for engaging and restraining said insert against vertical and lateral displacement relative to said plate to securely retain said insert in heat conducting engagement with said bottom plate, said insert having sufficient flexibility to be removable from said frame by resilient bending and displacement of said insert relative to said retaining means; and a handle attached to said frame.

6. A cooking utensil for supporting a disposable pan insert comprising: a sheet metal frame comprising a flat plate having four upwardly bent corner portions defining four insert retaining members for engagement with the peripheral portions of the insert to restrain the insert against lateral displacement relative to said plate; at least two of said retaining members having a height complemental to the depth of the insert and having inwardly bent retaining tabs at the upper end thereof adapted to extend over and frictionally engage the upper portions of the insert, at least one of the other retaining members having a height less than the depth of the insert to facilitate insertion and removal of the insert in and from said frame.

7. A cooking utensil utilizing a thin walled semirigid disposable pan insert comprising: a supporting plate adapted to be engaged by the bottom surface of the pan insert in heat conducting relationship therewith; and a plurality of insert retaining members extending upwardly from said plate to restrain the insert against lateral displacement during use of the utensil and to define an operative position of the pan insert on said plate; at least two of said retaining members having a height complemental to the depth of the pan insert and defining surfaces adapted to engage the upper surfaces of the pan insert to restrain the insert against vertical displacement relative to said plate; at least one of said retaining members having a height less than the depth of the pan insert to permit resilient bending and lateral displacement of the insert over said one retaining member to facilitate removal of the insert from said operative position thereof.

8. A cooking utensil for supporting a thin walled semirigid disposable pan insert having a predetermined depth comprising: a metal plate adapted to be engaged by the bottom surface of the insert in heat conducting relationship therewith; a plurality of insert retaining members formed integrally with said plate extending upwardly therefrom and spaced in a pattern complemental to the peripheral dimensions of the insert to engage the insert and retain the same in an operative position in heat conducting engagement with said plate; at least two of said retaining members defining surfaces adapted to engage the upper surfaces of the pan insert to restrain the insert against vertical displacement relative to said plate; at least one of said retaining members having a small height relative to the depth of the insert to permit bending and lateral displacement of the insert relative to said plate to facilitate removal of the insert from the utensil.

9. A cooking utensil as claimed in claim 8 further including a handle attached to one of said retaining members.

10. A cooking utensil for supporting a thin walled semirigid disposable pan insert comprising: a supporting plate adapted to be engaged by the bottom surface of the insert in heat conducting relationship therewith; and a plurality of spaced insert retaining members extending upwardly from said plate and having portions adapted to engage the upper surfaces of the insert to securely restrain the insert against vertical displacement relative to said plate; said retaining members being positioned to permit insertion and removal of the insert relative to the utensil by resilient deformation and movement of the insert.

11. A cooking utensil as claimed in claim 10 wherein said retaining members are formed integrally with said plate.

12. A cooking utensil utilizing a thin walled semirigid disposable pan insert of predetermined depth comprising: a metal plate adapted to be engaged by the bottom surface of the insert; a plurality of rigid insert retaining members extending upwardly from said plate and spaced in a pattern complemental to the peripheral dimensions of the insert; at least two of said insert retaining members having inwardly extending portions at the upper ends thereof respectively adapted to extend over and engage the upper portions of the insert to retain the insert in heat conducting engagement with said plate; said inwardly extending portions being spaced and shaped to permit insertion and removal of the insert from the utensil by resilient deformation and movement of the insert relative to said portions; and a handle attached to one of said retaining members.

13. A cooking utensil as claimed in claim 12 wherein said plurality of retaining members comprise three retaining members formed integral with said plate; said two retaining members having a height complement to the depth of the insert and having integral inwardly bent retaining tabs defining said inwardly extending portions.

14. A cooking utensil utilizing a thin walled semirigid disposable pan insert of pedetermined depth comprising: a metal plate adapted to be engaged by the bottom surface of the insert; at least two insert retaining members extending upward from said plate and spaced in a pattern generally complemental to the peripheral dimensions of the insert; spring extension members attached to said retaining members to extend upwardly therefrom respectively; each of said extension members having the upper portion thereof inwardly bent to define an insert retaining tab adapted to engage an upper portion of the insert to rigidly retain the insert on said plate in heat conducting engagement therewith and to permit insertion and removal of the insert by resilient deformation and movement of the insert; and a handle attached to one of said retaining members.

15. A cooking utensil utilizing a thin walled semirigid disposable pan insert of predetermined depth comprising: a metal plate adapted to be engaged by the bottom surface of the insert; at least two insert retaining members extending upwardly from said plate and spaced in a pattern generally complemental to the peripheral dimensions of the insert; two extension members adjustably mounted on said two retaining members respectively to extend upwardly therefrom, said extension members having the upper portions thereof inwardly bent to define two insert retaining tabs adapted to extend over and engage the upper portion of the insert to securely retain the insert in heat conducting engagement with said plate and to permit insertion and removal of the insert by resilient deformation and movement of the same; and a handle attached to one of said retaining members.

16. A cooking utensil for supporting thin walled semirigid disposable pan inserts of different predetermined depths comprising: a metal plate adapted to be engaged by the bottom surface of the insert; at least two insert retaining members extending upwardly from said plate and spaced in a pattern generally complemental to the peripheral dimensions of the inserts; two extension members each defining a plurality of vertically spaced inwardly extending insert retaining tabs, attached to said retaining members respectively; said tabs being selectively engageable with the upper portions of an insert to facilitate insertion of inserts of different depths; said tabs being positioned to permit insertion and removal of an insert by resilient bending and movement thereof; and a handle attached to one of said retaining members.

17. A cooking utensil utilizing a thin walled semirigid disposable pan insert of predetermined depth comprising: a metal plate adapted to be engaged by the bottom surface of the insert; at least two insert retaining members extending upwardly from said plate and spaced in a pattern generally complemental to the peripheral dimensions of the insert; an integral inwardly bent insert retaining tab at the upper end of one of said members; an integral outwardly bent flange at the upper end of the other of said members, releasable clamping means cooperative with said flange for clamping an upper portion of the insert to said other retaining member; said tab and said clamping means being cooperative to retain the insert in heat conducting engagement with said plate; and a handle attached to one of said retaining members.

18. A cooking utensil utilizing a thin walled semirigid disposable pan insert of predetermined depth comprising: a metal plate adapted to be engaged by the bottom surface of the insert; at least two sidewalls formed integrally with said plate and extending upwardly therefrom, said sidewalls having inwardly bent flanges at the upper end thereof adapted to engage the upper portions of the insert to thereby retain the insert in heat conducting engagement with said plate and positioned to permit insertion and removal of the insert by resilient deformation and bending thereof; and a handle attached to one of said sidewalls.

19. A cooking utensil as claimed in claim 18 wherein said bottom plate is of rectangular configuration for retaining a rectangular insert and wherein three of said sidewalls are provided.

References Cited
UNITED STATES PATENTS

| | | | |
|---|---|---|---|
| 271,744 | 2/1883 | Schifferle | 126—390 |
| 391,524 | 10/1888 | Farrell | 220—85 |
| 729,231 | 5/1903 | Smith | 294—34 |
| 1,396,684 | 11/1921 | Hansen | 99—422 |
| 1,781,635 | 11/1930 | Fischacher | 294—32 |
| 2,167,217 | 7/1939 | Milligan | 220—69 |
| 2,302,170 | 11/1942 | Basler | 248—311 |
| 2,367,256 | 1/1945 | Atkins | 248—311 |
| 2,911,175 | 11/1959 | Erie | 248—311 |
| 2,939,606 | 6/1960 | Durbin | 220—63 |

FOREIGN PATENTS 455,162  10/1936  Great Britain.

RAPHAEL H. SCHWARTZ, *Primary Examiner.*